(12) United States Patent
Al Shehri et al.

(10) Patent No.: US 10,643,324 B2
(45) Date of Patent: May 5, 2020

(54) MACHINE LEARNING SYSTEM AND DATA FUSION FOR OPTIMIZATION OF DEPLOYMENT CONDITIONS FOR DETECTION OF CORROSION UNDER INSULATION

(71) Applicants: Saudi Arabian Oil Company, Dhahran (SA); AVITAS SYSTEMS, INC., Menlo Park, CA (US)

(72) Inventors: Ali Al Shehri, Thuwal (SA); Ser Nam Lim, Hopkinton, MA (US); Ayman Amer, Thuwal (SA); Mustafa Uzunbas, Niskayuna, NY (US); Ahmad Aldabbagh, Thuwal (SA); Muhammad Ababtain, Thuwal (SA); Vincent Cunningham, Thuwal (SA); John Boot, Boston, MA (US); Godine Kok Yan Chan, Boston, MA (US)

(73) Assignees: Saudi Arabian Oil Company, Dhahran (SA); AVITAS SYSTEMS, INC., Menlo Park, CA (US)

( * ) Notice: Subject to any disclaimer, the term of this patent is extended or adjusted under 35 U.S.C. 154(b) by 0 days.

(21) Appl. No.: 16/254,831

(22) Filed: Jan. 23, 2019

(65) Prior Publication Data
US 2020/0074616 A1 Mar. 5, 2020

Related U.S. Application Data

(63) Continuation-in-part of application No. 16/117,937, filed on Aug. 30, 2018, now Pat. No. 10,533,937.

(51) Int. Cl.
*G06T 7/00* (2017.01)
*G01N 17/00* (2006.01)
(Continued)

(52) U.S. Cl.
CPC .......... *G06T 7/0004* (2013.01); *G01N 17/00* (2013.01); *G06K 9/6288* (2013.01); *G06N 20/00* (2019.01);
(Continued)

(58) Field of Classification Search
CPC ....... G06T 7/0004; G06N 20/00; G01N 17/00
See application file for complete search history.

(56) References Cited

U.S. PATENT DOCUMENTS 7,902,524 B2  3/2011  Safai et al.
8,596,861 B2  12/2013 Kane et al.
(Continued)

FOREIGN PATENT DOCUMENTS

CN          204086134 U       1/2015

OTHER PUBLICATIONS

Malhotra, Pankaj et al., "Long Short Term Memory Networks for Anomaly Detection in Time Series", ESANN (2015) pp. 89-94.
(Continued)

*Primary Examiner* — Hugh Maupin
(74) *Attorney, Agent, or Firm* — Leason Ellis LLP

(57) ABSTRACT

A system for predicting corrosion under insulation (CUI) in an infrastructure asset includes at least one infrared camera positioned to capture thermal images of the asset, at least one smart mount supporting and electrically coupled to the at least one infrared camera and including a wireless communication module, memory storage, a battery module operative to recharge the at least one infrared camera, an ambient sensor module adapted to obtain ambient condition data and a structural probe sensor to obtain CUI-related data from the asset. At least one computing device has a wireless communication module that communicates with the at least one smart mount and is configured with a machine learning algorithm that outputs a CUI prediction regarding the asset.

(Continued)

A cloud computing platform receive and stores the received data and the prediction output and to receive verification data for updating the machine learning algorithm stored on the computing device.

17 Claims, 11 Drawing Sheets

(51) Int. Cl.
 *G06K 9/62* (2006.01)
 *G06N 20/00* (2019.01)
(52) U.S. Cl.
 CPC .............. *G06T 2207/10048* (2013.01); *G06T 2207/30136* (2013.01)

(56) References Cited

U.S. PATENT DOCUMENTS

| | | |
|---|---|---|
| 9,518,918 B2 | 12/2016 | Mann et al. |
| 9,874,516 B2 | 1/2018 | Mann et al. |
| 2004/0257464 A1 | 12/2004 | Pandit et al. |
| 2005/0098728 A1 | 5/2005 | Alfano et al. |
| 2013/0037420 A1 | 2/2013 | Funahashi |
| 2014/0208163 A1 | 7/2014 | Domke et al. |
| 2015/0381948 A1 | 12/2015 | Renkis |
| 2016/0284075 A1 | 9/2016 | Phan et al. |
| 2016/0343106 A1 | 11/2016 | Hoole et al. |
| 2017/0176343 A1 | 6/2017 | Krishnan |
| 2017/0336323 A1 | 11/2017 | Mann et al. |
| 2018/0284735 A1 | 10/2018 | Cella et al. |
| 2018/0335404 A1 | 11/2018 | Amer et al. |
| 2019/0293552 A1 | 9/2019 | Georgeson et al. |
| 2019/0331301 A1 | 10/2019 | Du et al. |
| 2019/0339150 A1 | 11/2019 | Schiavone et al. |

OTHER PUBLICATIONS

"Corrosion Under Insulation and Fireproofing", American Petroleum Institute, API Recommended Practice 583, Second Edition, 2019.

Bello, Opeyemi, et al. "Application of artificial intelligence techniques in drilling system design and operations: a state of the art review and future research pathways." SPE Nigeria Annual International Conference and Exhibition. Society of Petroleum Engineers, 2016.

Ibarra-Castanedo, Clemente, et al. "Thermographic nondestructive evaluation: overview of revent progress." Thermosense XXV. vol. 5073. International Society for Optics and Photonics, 2003.

Sakagami, Takahide, et al. "Nondestructive evaluation technique using infrared thermography and terahertz imaging." Thermosense: Thermal Infrared Applications XXXVIII. vol. 9861. International Society for Optics and Photonics, 2016.

MACHINE LEARNING SYSTEM AND DATA FUSION FOR OPTIMIZATION OF DEPLOYMENT CONDITIONS FOR DETECTION OF CORROSION UNDER INSULATION

CROSS-REFERENCE TO RELATED APPLICATIONS

This application is a continuation-in-part of commonly-assigned and U.S. patent application Ser. No. 16/117,937 ('937 application), filed on Aug. 30, 2018 and entitled "Cloud-based machine learning system and data fusion for the prediction and detection of corrosion under insulation, which is hereby incorporated by reference as if set forth in its entirety herein.

FIELD OF THE INVENTION

The present invention relates to inspection technologies, and, more particularly, relates to a hardware and software-based system for the prediction and detection of corrosion under insulation (CUI).

BACKGROUND OF THE INVENTION

Corrosion under insulation (CUI) is a condition in which an insulated structure such as a metal pipe suffers corrosion on the metal surface beneath the insulation. As the corrosion cannot be easily observed due to the insulation covering, which typically surrounds the entire structure, CUI is challenging to detect. The typical causes of CUI are moisture buildup that infiltrates into the insulation material. Water can accumulate in the annular space between the insulation and the metal surface, causing surface corrosion. Sources of water that can induce corrosion include rain, water leaks, and condensation, cooling water tower drift, deluge systems and steam tracing leaks. While corrosion usually begins locally, it can progress at high rates especially if there are repetitive thermal heating and/or cooling cycles or contaminants in the water medium or surrounding air such as chloride or acid.

When CUI is undetected, the results of can lead to the shutdown of a process unit or an entire facility and can lead to catastrophic incidents. Since it is a hidden corrosion mechanism, the damage remains unnoticed until insulation is removed or advanced NDT (non-destructive testing) techniques, such as infrared thermography, are used to ascertain the metal condition beneath the insulation. Removal of insulation can be a time-consuming and costly process, while the accuracy of NDT techniques can be insufficient due to the large number of variables (e.g., geometrical, environmental, material-related), that cause false positives (incorrect detection of corrosion) and false negatives (incorrect non-detection of corrosion) in the detection process. Additionally, many facilities have elevated networks of pipes that are difficult to access, requiring scaffolding for visual inspection.

Due to these challenges, it has been found that localized visual inspections of assets are not reliably effective at detecting CUI, and they do not reflect conditions of the assets. There is a related technical gap in predictive risk assessment of CUI. Accordingly, there is a pressing need for improved detection and risk assessment tools to determine levels of CUI damage, institute proper maintenance scheduling, and reduce the burdensome costs imposed by this problem.

It is with respect to these and other considerations that the disclosure made herein is presented.

SUMMARY OF THE INVENTION

Embodiments of the present invention provide a system for predicting and detecting of corrosion under insulation (CUI) in an infrastructure asset using machine learning and data fusion. The system comprises at least one infrared camera positioned to capture thermal images of the asset, and at least one smart mount mechanically supporting and electrically coupled to the at least one infrared camera and having a position that is adjustable with respect to the asset. The at least one smart mount includes a communication module, memory storage adapted to store thermal image data received from the at least one camera, a battery module operative to recharge the at least one infrared camera, an ambient sensor module adapted to obtain ambient condition data, and at least one additional sensor adapted to obtain CUI-related data from the asset. The system further includes at least one computing device having a processor configured with instructions for executing a machine learning algorithm taking as inputs from either the communication module or memory storage of the at least one smart mount a) thermal images of the asset, b) the ambient condition data, c) CUI-related data from the probe sensor providing data fusion and d) result data obtained from conventional CUI tests, and adapted to output a CUI prediction regarding the asset. A machine-learning platform is adapted to train the machine learning algorithm based on accumulated input data received from the at least one computing device over time.

The at least one computing device is adapted to test current deployment conditions of the at least one infrared camera and at least one smart mount by executing the machine learning algorithm using current infrared images, ambient sensor data and CUI-related data by determining whether performance of the machine learning algorithm under current deployment conditions meets a threshold level.

In some embodiments, the performance of the machine learning algorithm conditions is measured by corrosion prediction accuracy. In other embodiments, the performance of the current deployment conditions is measured by a cost of deployment and testing. In still further embodiments, the performance of the current deployment conditions is measured by a speed of deployment and testing.

The deployment conditions tested by the at least one computing device can include a time of year in which the at least one infrared camera and at least one smart mount are deployed, a time of day in which the at least one infrared camera and at least one smart mount are deployed, a position, orientation and image capture duration of the at least one camera, and a position, type and number of images captured per time period of the at least one camera.

Embodiments of the present invention also provide a method of optimizing deployment conditions of at least one investigative kit for obtaining data from an infrastructure asset to enable prediction and detection of corrosion-under-insulation (CUI). The method comprises receiving thermal images, sensor data acquired from asset over time acquired by the at least one investigative kit and deployment condition information regarding the at least one investigative kit, obtaining result data of conventional CUI detection methods corresponding of the asset over time, training a machine learning algorithm using the captured thermal images and other sensor data and the result data acquired from the asset, and testing the deployment conditions of the at least one investigative kit. The testing of deployment conditions includes receiving current test conditions including ambient condition data and current deployment conditions at the at least one investigative kit to obtain ambient condition data over time, executing the machine learning algorithm using the ambient conditions data and current deployment conditions of the at least one investigative kit, and determining whether a performance of the machine learning algorithm based on the test conditions exceeds a preset performance threshold. If performance of the machine learning algorithm exceeds the threshold, the deployment conditions are optimized using the test conditions. In contrast, if performance of the machine learning algorithm does not exceed the threshold, the deployment conditions of the at least one investigative kit are changed, and the machine learning algorithm is repeated iteratively until performance exceeds the threshold or a set number of repetitions have been conducted.

In some embodiments, the method further comprises measuring the performance of the machine learning algorithm based on corrosion prediction accuracy using current test conditions. In other embodiments, the method further comprises measuring the performance of the machine learning algorithm based on a cost of deployment and testing. In still further embodiments, the method comprises measuring the performance of the machine learning algorithm based on a speed of deployment and testing.

The current deployment conditions can include a time of year at which the at least one investigative kit is deployed, a time of day at which the at least one investigative kit is deployed, a position, orientation and image capture duration of the at least one investigative kit, and a position, type and number of images capture per time period of the at least one investigative kit.

These and other aspects, features, and advantages can be appreciated from the following description of certain embodiments of the invention and the accompanying drawing figures and claims.

DETAILED DESCRIPTION OF CERTAIN EMBODIMENTS OF THE INVENTION

Embodiments of the present invention provide a predictive approach for detecting corrosion under insulation (CUI) taking into account dependent and independent surrounding variables. Thermal images of investigated assets are captured over time.

As a series of thermal images of the same or overlapping area(s) are captured over time, changes in phenomena can be readily observed, including the impact of temporary issues such as wind. The thermal images can provide several types, or orders, of temperature information that can be indicative of locations vulnerable to CUT. The first order of temperature information is regular temperature (T) data revealed by the color shown in the thermal images. The second order of temperature information is changes in temperature ($\Delta T$), such as the contrasts shown between different regions, and a third order of information is rate of change in temperature analytics ($df(T)/dt$) as determined by analysis of a series of images over time. Additional evaluations are performed with an independent non-destructive testing (NDT) technique, such as, for example, electromagnetic detection at other portions of the EM spectrum, or magnetometry, to determine correlative relationships. This "sensor fusion" increases the accuracy of CUI detection, shadow detection, or abnormal process activities, the effects of which can be minimized. Ambient condition data such as the time of day, weather, process conditions, etc. can be included as parameter inputs to machine learning algorithms that are used to generate conclusions from the multiple sources of input. Additionally, in some embodiments, to reduce the effects of "noise" in the thermal images caused by shadows, reflections or other artifacts, a noise filter can be employed as a preprocessing step.

Through the combination of sensor fusion and time-based analysis non-determinative or confounding variables can be excluded, allowing the learning algorithms to zero-in on anomalies that are contrary to ambient conditions, and thus are more likely indicative of CUT. Such anomalies are recorded; afterwards field engineers can perform a verification inspection upon the locations where such anomalies occur. The results of the field inspection (i.e., a "CUI verified" or "CUI not verified") can be stored locally or on cloud-based platforms and used to train supervised machine learning systems, enabling the systems to become more 'intelligent' over time as parameters (weights, factors) are refined over time by a continually more encompassing data set.

Figure 1:
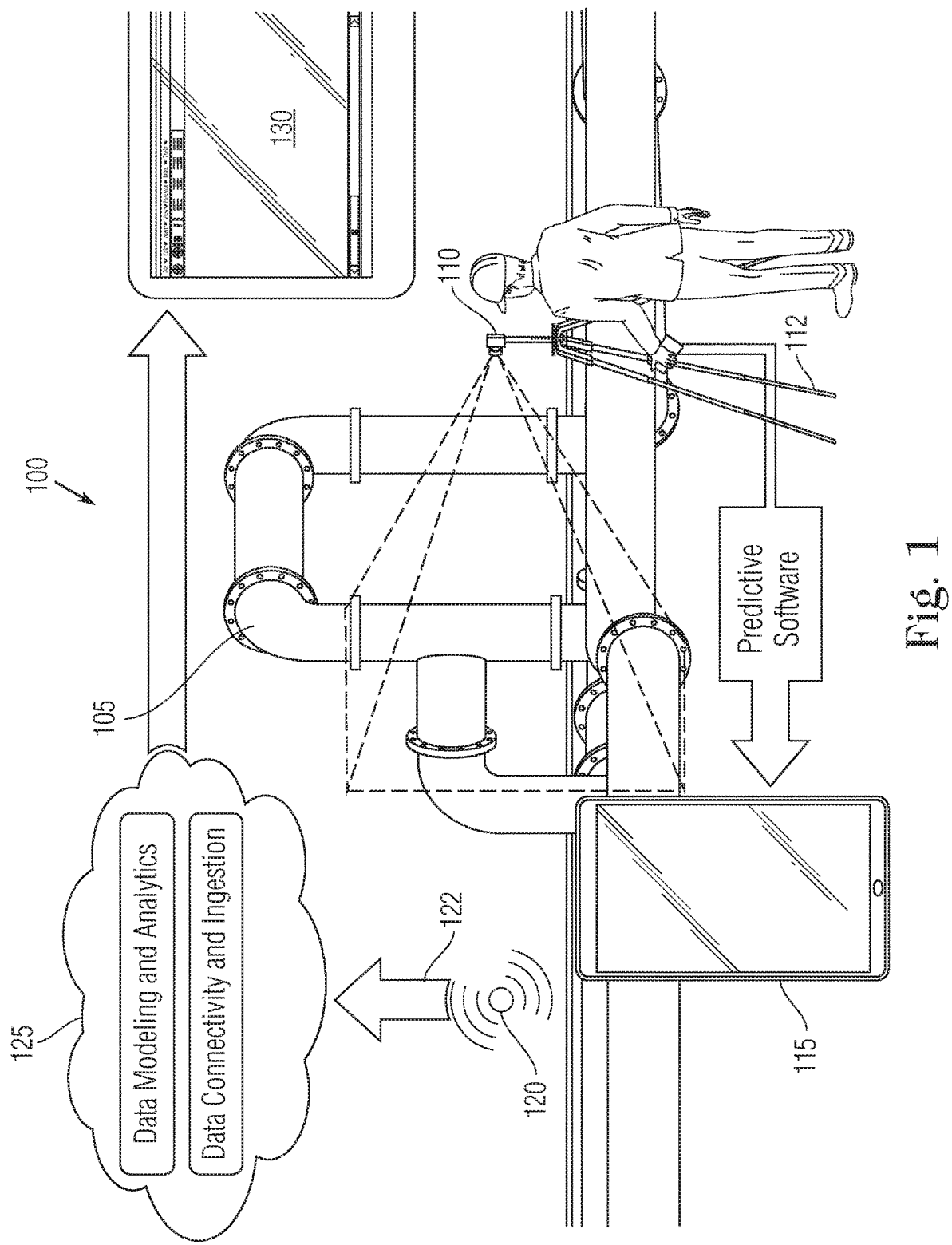
FIG. 1 is a schematic illustration of a cloud-based learning system for predicting and detecting CUI according to an embodiment of the present invention.

FIG. 1 is a schematic illustration of a machine learning system 100 for prediction and detection of CUI according an embodiment of the present invention. FIG. 1 shows an exemplary structure 105 to be tested, in this case a set of insulated pipes. The insulated pipes of this example can comprise a metallic pipe conduit surrounded by one or more layers of insulation. Corrosion, when it occurs, tends form in the annular region between the insulation and the metallic pipe where moisture can become trapped and accumulate. In FIG. 1, one or more infrared cameras 110 (only one camera is shown in the figure) are situated proximally to the structure 105 to capture infrared radiation and record thermal images emitted from the structure. One example of a suitable infrared camera for CUI detection is the C3 Wi-Fi enabled thermal camera supplied by FLIR Systems, Inc. of Wilsonville, Oreg., although other devices can also be used. The thermal images captured from the structure 105 can reveal internal thermal contrasts within the structure that are undetectable in the visible spectrum radiation and can be indicative of moisture accumulation and/or corrosion. The infrared camera 110 preferably captures thermal images received from regions of the structure continuously over a selected duration, and/or intermittently at different times or dates. Infrared camera 110 is adapted to convert the thermal images into a standardized computer-readable file format (i.e., thermograph files, jpgs).

The infrared camera 110 is positioned on a mount 112, which as described in greater detail below, can be "smart" and have a variety of components and functions. In some embodiments, the mount can be implemented as a tripod. The mount 112 can be extendable to reach high elevations on the structure (e.g., by telescoping) and can include a mechanical head fixture coupling to the camera that has several degrees of freedom to pan and tilt at various angles with respect to a fixed plane. Field technical personal can set the extension and orientation of the mount head to capture thermal images from different areas of the structure, as required.

In some facilities, identification tags can be posted on assets, or portions thereof. The precise geographical location of each tag can be determined using GPS. The identification tags can be implemented using image-based tags such as QR codes that are readable from a distance. To take advantage of the tagging feature, in some embodiments, a standard camera can be included along with the infrared camera on the mount to scan tags on the assets. Depending on the size of tags (of known size) in the image, distances from the camera to the tags can be determined. Tagging enables simultaneous scanning and localization of the facility assets without the need to create complex three-dimensional CAD models of the facility.

The infrared camera 110 can be physically and communicatively coupled to the mount 112 (e.g., wirelessly by Bluetooth or Wi-Fi communication). The mount 112 also includes or is coupled to one or more additional detectors, such as a visible light sensor (regular camera), or an electromagnetic sensor (not shown in FIG. 1), which can be used to probe the structure and obtain supplemental readings to complement the data obtained by thermal imaging. In this manner, data from two or more distinct and independent sensing modes can be combined, referred to as "sensor fusion", that can make downstream prediction and detection much more robust by reduction of false positive classifications. The mount 112 also includes sensors for detecting ambient conditions including temperature, humidity, and air pressure. Received thermal images can be associated with the ambient conditions and the current time at which the ambient conditions are recorded. This data comprises parameters used by the machine learning algorithms that contribute to the interpretation and classification of the thermal images captured from the structure.

In some embodiments, the mount 112 can be communicatively coupled to a computing device 115, which can be a tablet, laptop or any other suitable computing device with sufficient processing and memory capability that can be conveniently taken onsite in the field for use by field technical professionals. In such embodiments, the mount 112 is operative to transmit thermographic files received from the camera 110 to the computing device 115. In other embodiments, data stored by the infrared camera 110 and other sensors of mount 112 can be stored locally, for example in a memory card, and then transferred to computing device 115. The computing device 115 preferably stores executable applications for predictive analysis. Prior to predictive analysis, the thermal images can be preprocessed by the infrared camera 110 and/or the computing device 115. Preprocessing can include image filtering steps for reducing noise in the images that can arise from many causes. The computer device also executes one or more machine learning algorithms that take the received thermograph files (thermal images) as inputs and output a prediction as to the probability that the thermal images contain anomalies of interest in real time. As discussed in related commonly-owned application, U.S. patent application Ser. No. 15/712,490, entitled "Thermography Image Processing with Neural Networks to Identify Corrosion Under Insulation (CUI)", a plurality of machine learning algorithms, including deep learning algorithms can be used for CUI detection. In some implementations, convolutional networks, which are useful for classifying images in detail, are used in a first stage, and recurrent neural networks, which are useful for tracking changes over time, are used in an additional stage. The computing device 115 provides the output of the machine learning algorithms in an application user interface that can be conveniently consulted by field technical personnel. Real time predicative analysis in the field allows field technical personal to support observations and focus rapidly on high-risk areas of the structure that are more likely subject to corrosion damage.

In the depicted embodiment, the computing device 115 communicates wirelessly via a network switch 120 (via wireless communication network 122) with a cloud computing platform 125. Alternatively, the computing device can be coupled via a wired connection to a computer network and to cloud computing platform 125. Wireless network 122 can be a wireless local area network (WLAN), wireless wide area networks (WWAN), cellular networks or a combination of such networks. The cloud computing platform 125 comprises computing resources, typically dynamically allocated, including one or more processors (e.g., one or more servers or server clusters), that can operate independently or collaboratively in a distributed computing configuration. The cloud computing platform 125 includes database storage capacity for storing computer-executable instructions for hosting applications and for archiving received data for long term storage. For example, computing device 115 in the field can upload all thermal image and other data received to the cloud computing platform 125 for secure storage and for further processing and analysis. More specifically, the computing device 115 can format and send data records in, for example, MySQL or another database format. An example database record can include, among other fields, a tagged asset location, a series of thermal images taken over time at a particular asset location (or a link thereto), the data value for the camera's ID (cameraID) of the camera that captured the thermal images, the time/date at which each image was captured, ambient conditions at the time/date (e.g., temperature), sensor fusion data (e.g., visible light, electromagnetic data). The cloud database can store include a detailed geographical mapping of the location and layout of the infrastructure assets (e.g., from LiDAR data) and applications executed on the cloud platform can perform detailed analyses that combine the sensor data and predictive analyses with the detailed mapping of the assets to make risk assessments covering entire structures or groups of structures. Reports of such assessments and results of other processing performed at the cloud computing platform 125 are accessible to a control station 130 communicatively coupled to the cloud computing platform. In alternative embodiments, it is possible for the smart mount 112 to format and transmit the received data to the cloud computing platform directly before analysis of the data is performed on site.

Figure 2:
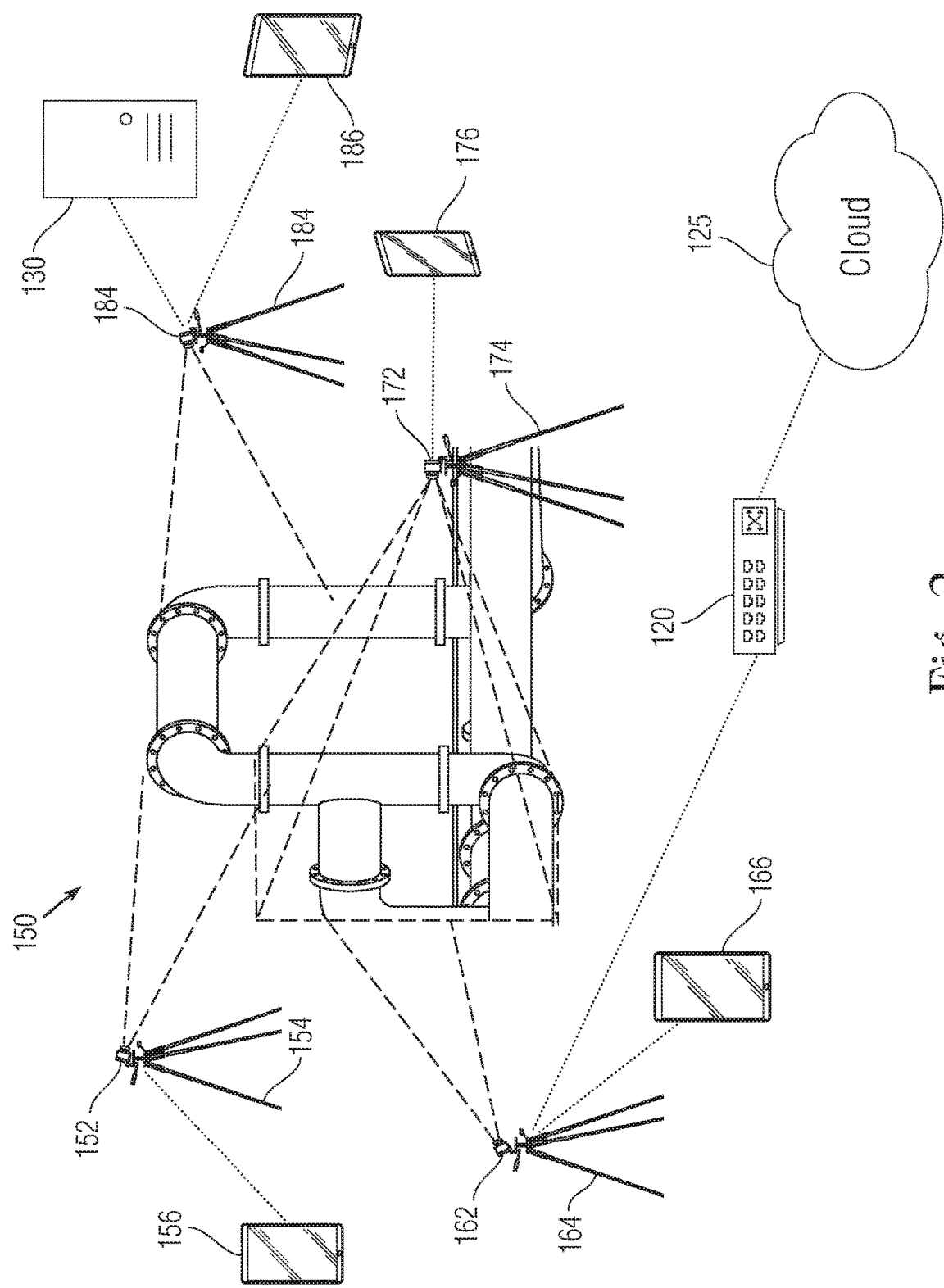
FIG. 2 is a schematic illustration of an embodiment of the cloud-based system in which four infrared cameras and corresponding smart mounts and computing devices are deployed to monitor a structure for CUI.

FIG. 2 depicts an exemplary implementation of a cloud-based learning system for CUI prediction and detection more generally shown in FIG. 1. In FIG. 2, this system 150 includes four sets of cameras, mounts and computing devices ("investigative kits") positioned at various positions in proximity to structure 105 for capturing thermal image and other data. Although four investigative kits are used in this embodiment, it is again noted that fewer or a greater number of kits can be employed depending, for example, on the size of the structure or installation investigated. More specifically, the system 150 is configured using a first infrared camera 152 associated with a first mount 154 and first computing device 156 positioned at a first location; a second infrared camera 162 associated with a second mount 164 and second computing device 166 positioned at a second location; a third infrared camera 172 associated with a third mount 174 and third computing device 176 positioned at a third location; and a fourth infrared camera 182 associated with a fourth mount 184 and fourth computing device 186 positioned at a forth location proximal to the asset 105. Two-way wireless communications can be supported by all the mounts and computing devices of the system, each of which can thus communicate with each other. For example, thermal image data received by the computing devices 156, 166, 176, 186, can be transmitted to the cloud computing platform 125 via network switch 120, and to control station 130. Alternatively, the smart mounts 154, 164, 174, 184 can communicate directly with the control station when wireless connectivity is available. By providing redundant connectivity, each smart mount or computing device in the system can act as a communication node in a multi-node system, so that if one or more of the mounts or computing devices loses connectivity with the control station, data can be forwarded to other nodes that maintain connectivity. The control station 130 is configured to provide configuration and control commands to the smart mounts 154, 164, 174, 184 or computing devices 156, 166, 176, 186.

To take readings from numerous structures and locations in a facility, the investigative kits can be moved manually or automatically. As the kits are moved to different positions, infrared images and other sensor readings are obtained over a range of points in a given space (i.e., a Cartesian space, x, y and z) and are provided to the computing device for processing as described herein. For example, the sensor data can initially produces sets of vector data $(x_1, y_1, z_1, i(sensor)_1) \ldots (x_n, y_n, z_n, i(sensor)_n)$ for the sensor data and $(x_1, y_1, z_1, i(inf)_1) \ldots (x_n, y_n, z_n, i(inf)_n)$ for the infrared image data. The two sets of data can be combined in a single vector, i.e., $(x_n, y_n, z_n, i(sensor)_n, i(inf)_n)$, when the data is captured from substantially the same location (i.e., there is no offset, or there is a finite offset, between the areas sensed by the non-infrared and infrared sensors, respectively). As described further below, for each pair of sensing modes (or more than two modes) for a given location, the computing system makes a prediction as to whether the asset location has been subject to corrosion. The data mappings are thereby supplemented with a prediction obtained by feeding a prediction engine with a model such as, for example, $(x_n, y_n, z_n, iTHz_n, i(inf)_n, Prediction_n)$. As predictions are determined over a large three-dimensional space at a facility, in some instances "hot" areas in which several data points in the same vicinity are associated with a positive prediction of corrosion can be identified. Likewise, contiguous areas in which comparatively less or no corrosion has been predicted can also be identified. Remedial measures can then be applied to such hot areas and not to the other areas in which comparatively less corrosion has been determined. In this manner, insulation removal and other remedial measures can be performed on specific sections in which there is a high probability of corrosion damage, eliminating the need to remove sections of insulation randomly or according to a statistical pattern to determine the presence of corrosion.

Figure 3:
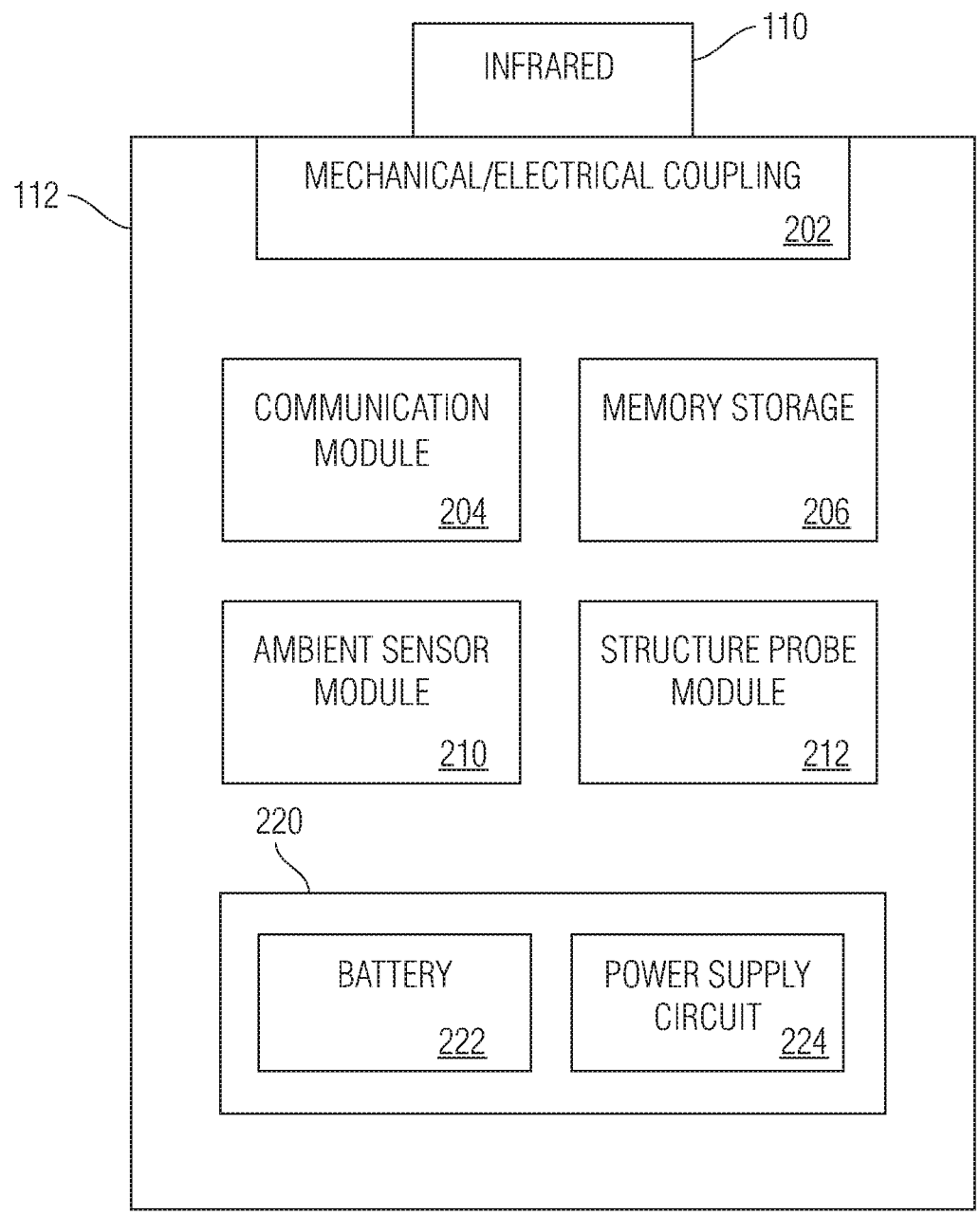
FIG. 3 is a block diagram showing functional elements of a smart mount according to an exemplary embodiment of the present invention.

FIG. 3 is a block diagram showing functional elements of a smart mount according to an exemplary embodiment of the present invention. The smart mount 112 includes a camera coupling or mount 202 by means of which the infrared camera 110 can be securely mechanical affixed and electrically connected to the mount 112. As noted above, the camera coupling 202 can include expandable and rotatable elements, such as telescoping shafts, and various joints with degrees of freedom for enabling the camera to be translated and tilted to a desired position and orientation. In some implementations, the smart mount can be supported on a counterweighted movable to provide a steering sub-system on the ground.

To enable inter-communication with other elements of the system, the smart mount 112 can include a communication module 204 which can include an antenna, a transceiver, and electronic components configured to support two-way wireless communication with other smart mounts, computing devices, and the control station 130. The smart mount 112 also includes a memory module 206 which can be implemented using SSD card memory. If the infrared cameras are mounted in locations where signal obstructions result in suboptimal data rates that are inferior to the actual thermal image streaming rate, the onboard memory module can be used to store the thermal image stream to provide latency while the wireless attempts to support the data download.

The smart mount 112 further includes an ambient sensor module 210 that can include temperature, humidity and pressure sensors. An additional structural probe sensor module 212 includes detectors that can be used to probe the structure for CUI using modes distinct from thermal imaging, including, without limitation, visible photography, magnetic (magnetometry) and ultrasonic detectors. Together with the thermal images from the infrared camera, the structural probe sensor module provides the sensor fusion that enhances CUI prediction and risk assessment. An electrical power module 220 includes a battery module 222 of sufficient size to provide electrical power for the smart mount components and to charge the infrared camera battery via a power supply circuit 224 for a suitable data gathering period before requiring recharging. A suitable duration for data gathering can be for example, about 45 minutes to about 90 minutes. Larger or smaller batteries can be employed for longer or shorter data gathering periods.

In operation, the field computing devices receive (ingest) thermal image, probe sensor and ambient condition data from the infrared cameras and smart mounts. The initial data ingest can be affected by conditions at the site, including, shadows, reflections and spurious signals. As noted above, before executing machine learning algorithms, it can be useful to filter incoming data for noise using noise filtering mechanism integrated within software (or firmware or hardware if the filtering mechanism is implemented in the infrared camera) as a preprocessing step to filter out noise and amplify the signal-to-noise ratio. In some embodiments, ingested data can be filtered by dimensionality reduction and autoencoding techniques. In other embodiments, linear or non-linear smoothing filters can be applied instead of or in addition to dimensionality reduction techniques. The noise filtering step helps discriminate CUI signals from shadows, reflections as well as normal near infrared thermal signals. While such noise and other artifacts in the data can be eventually recognized and compensated for in the machine learning process using multi-context embedding in the neural network stage, it can be more time and resource efficient to preprocess the data by filtering in this manner.

Another refinement which can be used to enhance robustness to noise, is the introduction of synthetic training data to supplement data taken from the field. Mathematical models including finite element analyses are based on the thermal dynamics of insulated metal structures and on thermal images taken in the field as a basis for calibration and comparison. The synthetic data can be to simulate and augment the thermal image training dataset. The synthetic data can also make the learning system more robust to different environmental conditions such as weather conditions, temperature, exposure to sun light, and material temperature behind the insulation, for example. The synthetic data can be generated locally by the computing devices or the cloud computing platform. In either case the synthetic data can incorporated in the training and application database at the cloud computing platform.

Figure 4:
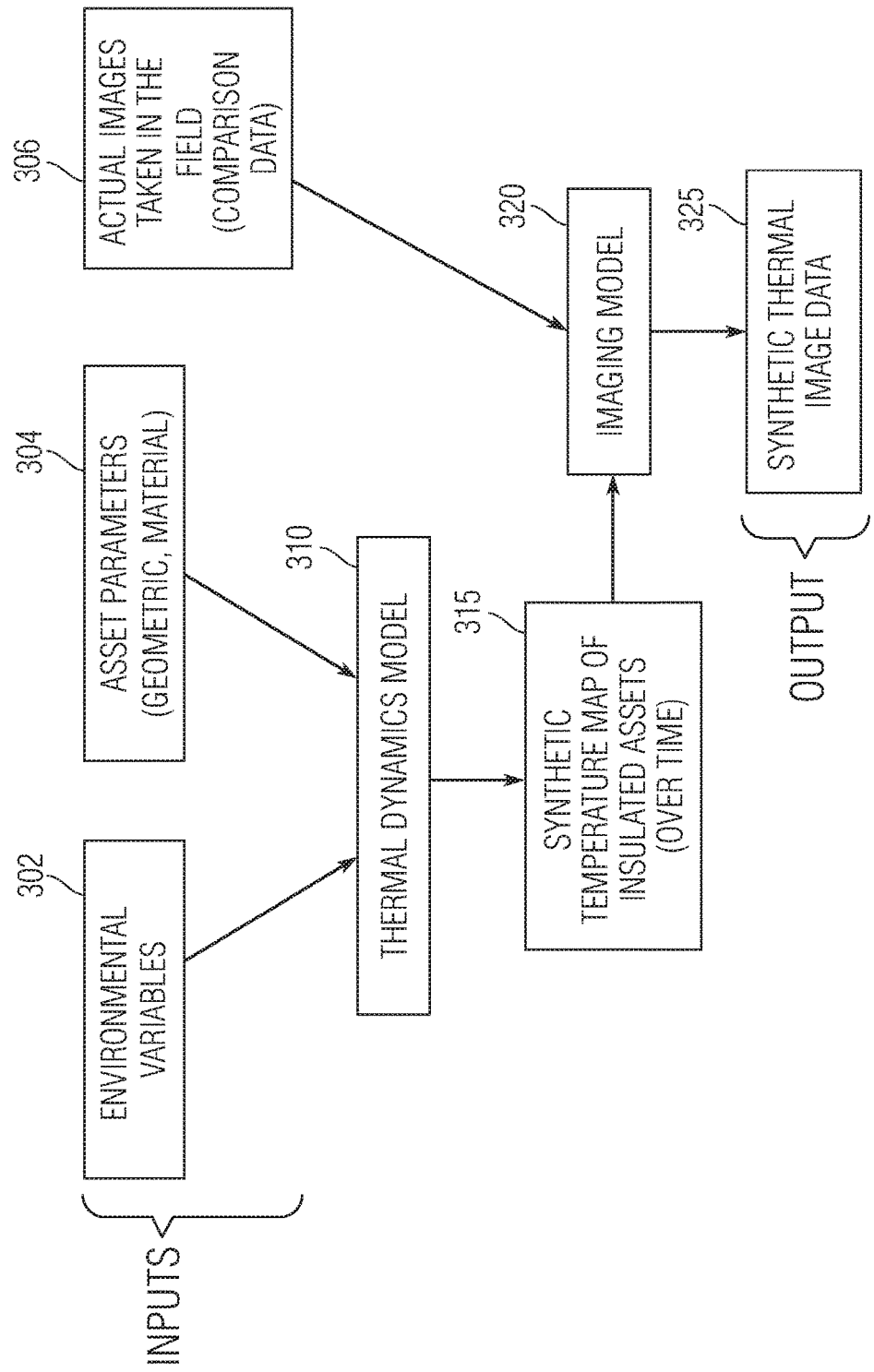
FIG. 4 is a block flow diagram illustrating a method for generating synthetic thermal image data structures according to an exemplary embodiment of the present invention.

FIG. 4 is a block flow diagram illustrating a method for generating synthetic thermal image data structures according to the present invention for supplementing a training set for a predictive machine learning model. The inputs for generating synthetic thermal images include environmental variables 302 (e.g., temperature, humidity, air pressure, time of day), asset parameters 304 (e.g., dimensions, position, material, insulation), and a set of thermal images 306 of various assets captured in the field ("field thermographs"). The environmental variables 302 and asset parameters 304 are input to a thermal dynamics model 310 that uses known thermodynamic properties of materials based on environmental conditions to generate a synthetic temperature map 315 of insulated assets over time, based on a random probability distribution of temperature and humidity conditions. The synthetic temperature map 315 and the field thermographs are inputs to an imaging model 320. While images can be created from the temperature map alone, the field thermographs can be used as a basis of calibration and comparison. As an example, if a temperature maps of assets exhibits a tendency toward greater temperature contrasts than shown in field thermographs of similar asset under similar conditions, the imaging model can make weighting adjustments to bring the temperature map closer to the field thermographs. After such adjustments are made, the imaging model generates a set of synthetic thermal images 325 that can be used to supplement the field thermographs during training.

Figures 5A, 5B:
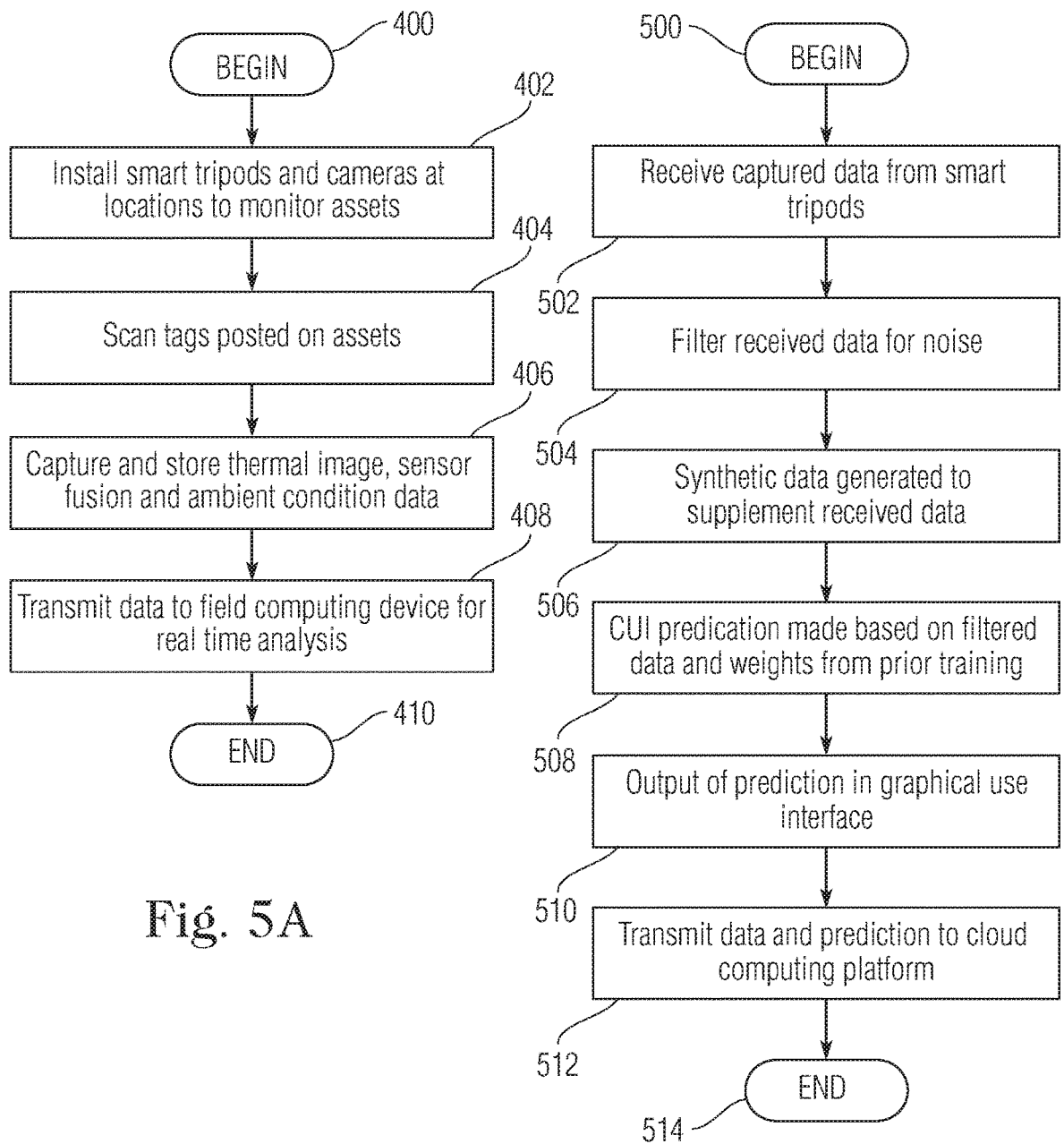
FIG. 5A is a flow chart of a method for acquiring data for CUI predication performed using an investigative kit according to an embodiment of the present invention.
FIG. 5B is a flow chart of a method of real time CUI prediction according to an embodiment of the present invention.

FIG. 5A is a flow chart of a method for acquiring data for CUI predication performed using an investigative kit according to an embodiment of the present invention. The method begins in step 400. In step 402, smart mounts and cameras (infrared, standard) are installed at suitable locations to monitor assets at a facility. In step 404, any tags posted on the assets are scanned. In step 406, thermal image, sensor fusion, and ambient condition data are captured and stored in memory. In step 408, this information is transmitted to a local computing device for real time analysis. The method ends in step 410.

FIG. 5B is a flow chart of a method of real time CUI prediction according to an embodiment of the present invention. In step 500 the method begins. In step 502, the computing device receives the captured data from the smart mounts. In step 504, the received data is filtered for noise. In step 506, CUI prediction and detection is conducted using machine learning algorithms based on the filtered data and parameter weights from prior training. The machine learning algorithms can include deep learning techniques such as convolutional and recurrent neural networks. In an optional step 508, synthetic data is generated to supplement the data received from the smart mounts. In step 510, prediction output is generated on a graphical user interface to be viewed by field technical personnel. In a following step 512, the received data and the prediction output is transmitted to the cloud computing platform. In step 514, the method ends.

Figure 6:
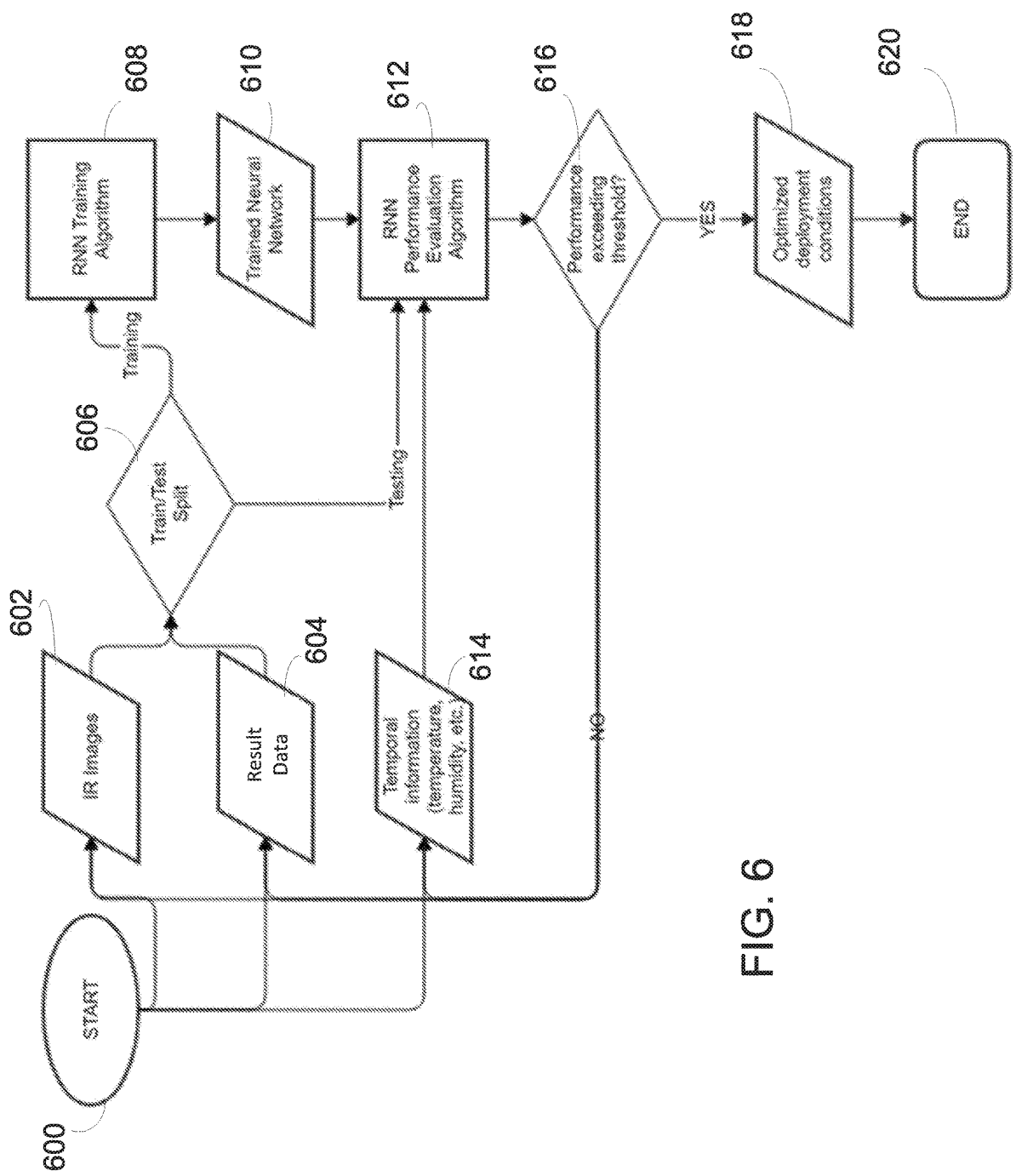
FIG. 6 is a flow chart of a method of using a machine learning system to optimize deployment conditions for deploying investigative kit for CUI detection according to an embodiment of the present invention.

FIG. 6 is a flow chart of a method of using a machine learning system to optimize deployment conditions for deploying investigative kit for CUI detection according to an embodiment of the present invention. The method starts in step 600. In step 602 infrared images and other sensor fusion data are input to the system. In step 604, result data (images) of conventional invasive corrosion testing is input to the system. The results data is used to correlate the infrared and other data with actual results in the field in order to train the system to correlate certain observed conditions with the presence or absence of corrosion.

At step 606, the machine learning system receives the input data and determines whether to apply the data for training versus testing. In training, the machine learning system applies the data to optimize parameters for correlating the image and sensor data with the results data. In other words, training attempts to match the results (presence or absence of corrosion) with certain types of infrared image data and other sensor data received over time. The optimized parameters can be coefficients that are applied to the different orders of temperature data, such as one or all of temperature (T), static or dynamic temperature contrasts (ΔT), or rates of change in temperature analytics (df(T)/dt). Additionally, the parameters can include deployment characteristics of the of the investigative kit, as will be described further below. In contrast, during testing, the machine learning system uses current data or different data from the data that was used for training, to determine whether the trained system is robust and is applicable to a wide variety conditions. If it is determined by the processor executing instructions configured to implement this algorithm, in step 606, that the data is to be used for training, the data is used, in step 608, in a machine learning algorithm. In step 610, the machine learning algorithm generates a trained neural network with parameters optimized based on the input data. If it is determined by the processor executing instructions, in step 606, that the data is to be used for testing, in step 612 the data is applied to test the robustness of the optimized parameters generated in step 608. In order to test the data in step 612, in step 614 temporal condition data (i.e., time, date, temperature($t_1, t_2, \ldots t_n$), humidity($t_1, t_2, \ldots t_n$), wind speed($t_1, t_2, \ldots t_n$)) obtained as a time series over a period by the investigative kit in the field is also used as an input during testing along with new IR image and result data.

In step 616 it is determined by the processor executing instructions whether the performance of the machine learning algorithm, using the temporal ambient condition data 614 and current IR images 602 and results data 604, exceeds a preset threshold. The preset threshold for determining efficacy of the test performance can be a set percentage of accurate predictions of the machine algorithm based on the test data (e.g., 90%) that match result data. If the threshold is reached, it is determined in step 618 that the parameters, such as deployment conditions, have been optimized. The method then ends in step 620. If the test does not meet the threshold, the method reverts back to steps 602, 604 and 614, in which data is obtained for another iteration of training and testing.

Figure 7A:
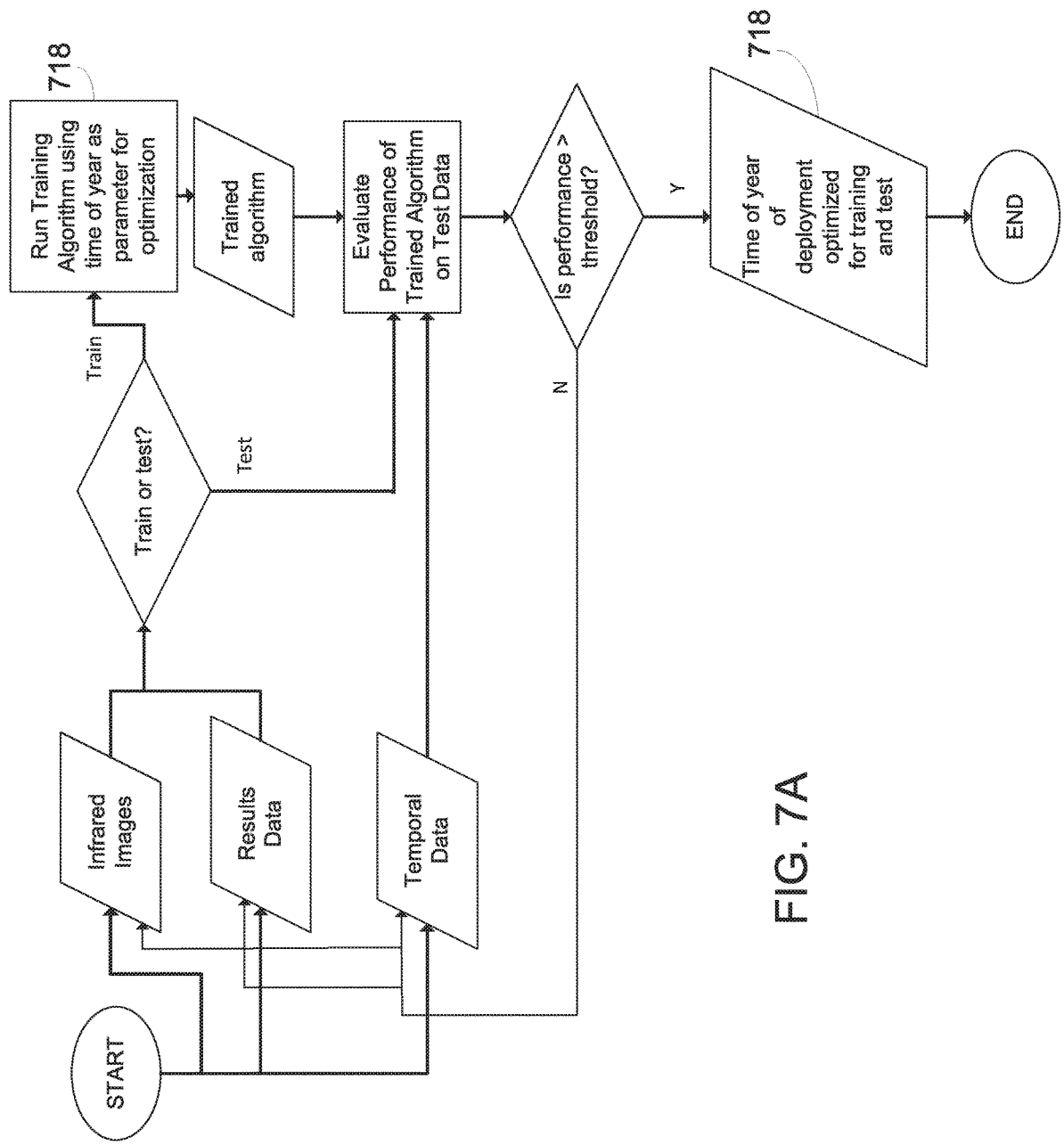
FIG. 7A is a flow chart for optimizing a time of year for corrosion detection according to an embodiment of the present invention.

FIGS. 7A, 7B, 7C, and 7D are flow charts, based on the flow chart of FIG. 6, for optimizing particular deployment conditions for determining corrosion at a facility site. The flow chart of FIG. 7A is identical to the flow chart of FIG. 6 except that in step 708, which is analogous to step 608 in FIG. 6, the machine algorithm optimizes performance using the time of year of testing as a deployment condition variable. The time of year during which a test is performed determines, at least in part, the angle of incident sunlight upon the investigated structures, and also partially determines the rate at which the structures heat up or cool down due to the intensity of incident sunlight. Additionally, the time of year can determine the level of humidity (for example, humidity can vary in a seasonal manner). Due to the relationship between time of year and ambient temperature and humidity conditions, the time of year of deployment of the investigative kits can affect the accuracy of corrosion detection. It would therefore be useful for engineers to know what times of year that are optimal for corrosion testing. This can be determined through the machine learning algorithms using programming in the processor to implement, for instance, recurrent neural networks. In step 718, after it is determined by the processor executing instructions whether the test data has exceeded the threshold for performance, the optimal times of year can be determined and reported as an output of the machine learning and testing process. FIG. 8A is an exemplary graph of performance versus time of year and shows that over a portion of the year 802 (covering a part of summer and most of autumn) in which the performance is above a preset accuracy threshold (e.g., 85%). The graph of FIG. 8A indicates that late summary and autumn are, in general, the best times for performing corrosion testing of structures in the field. It is noted that the example graph shown in FIG. 8A is merely illustrative of the principles of the present invention and is not meant to represent that these times of the year are actually optimal in this regard.

Figure 7B:
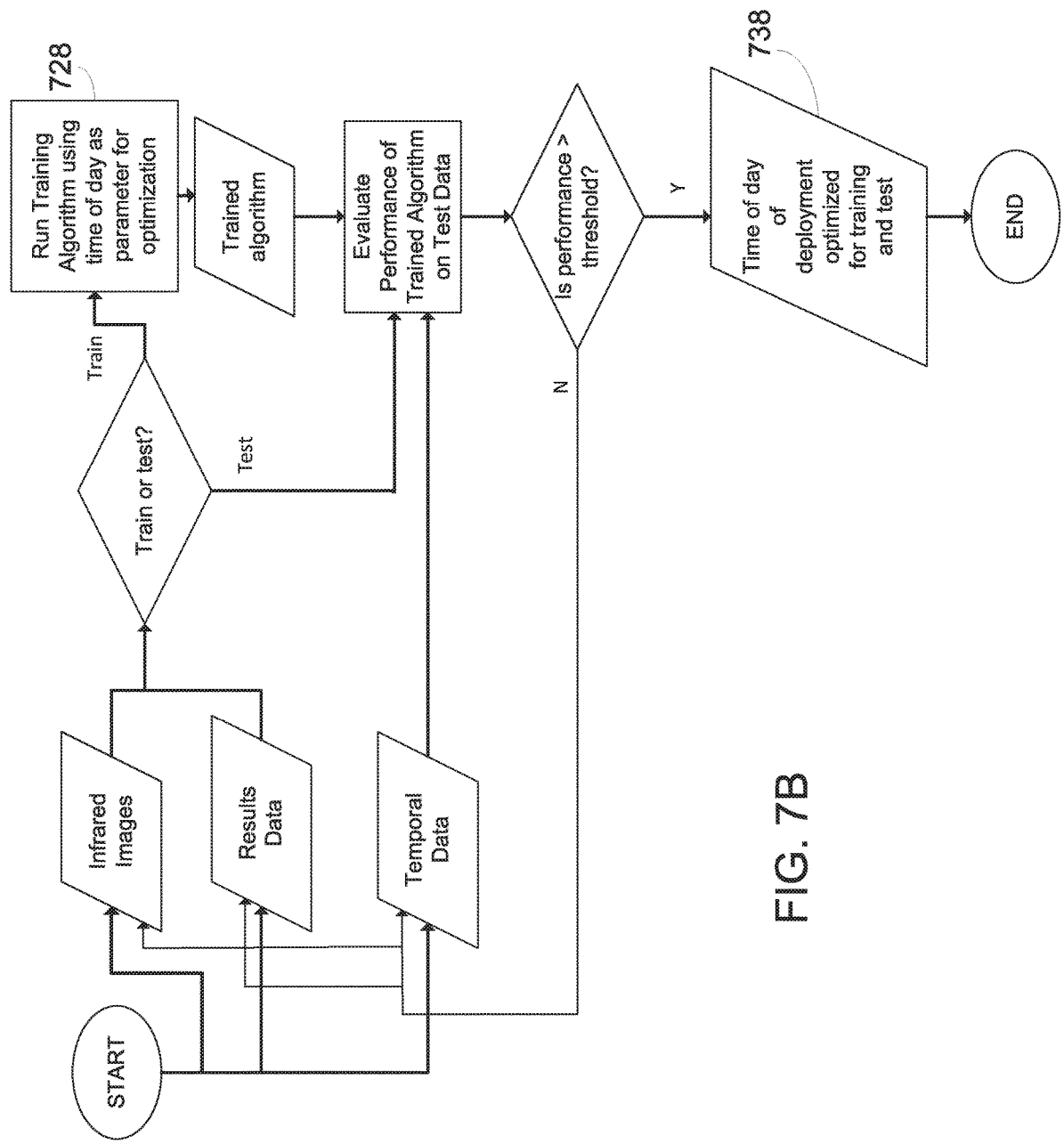
FIG. 7B is a flow chart for optimizing a time of day for corrosion detection according to an embodiment of the present invention.
Figure 8A:
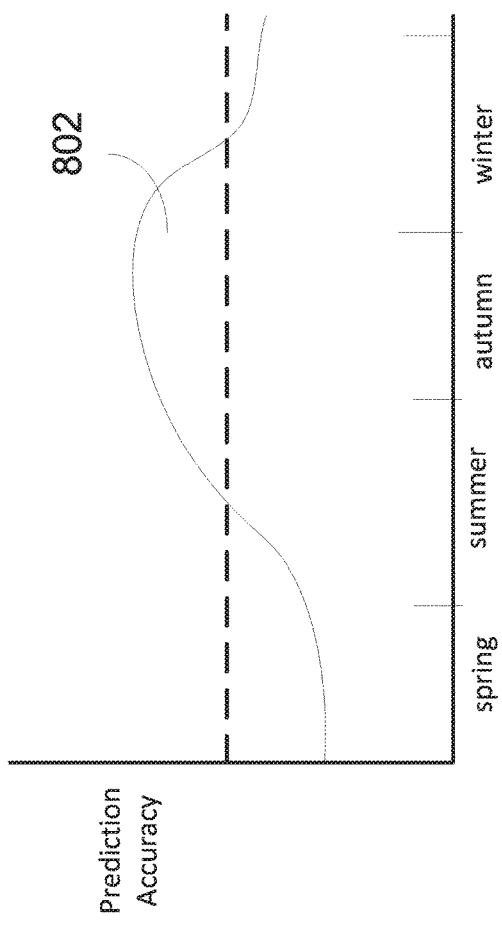
FIG. 8A is an exemplary graph of predictive accuracy of corrosion versus time of year.
Figure 8B:
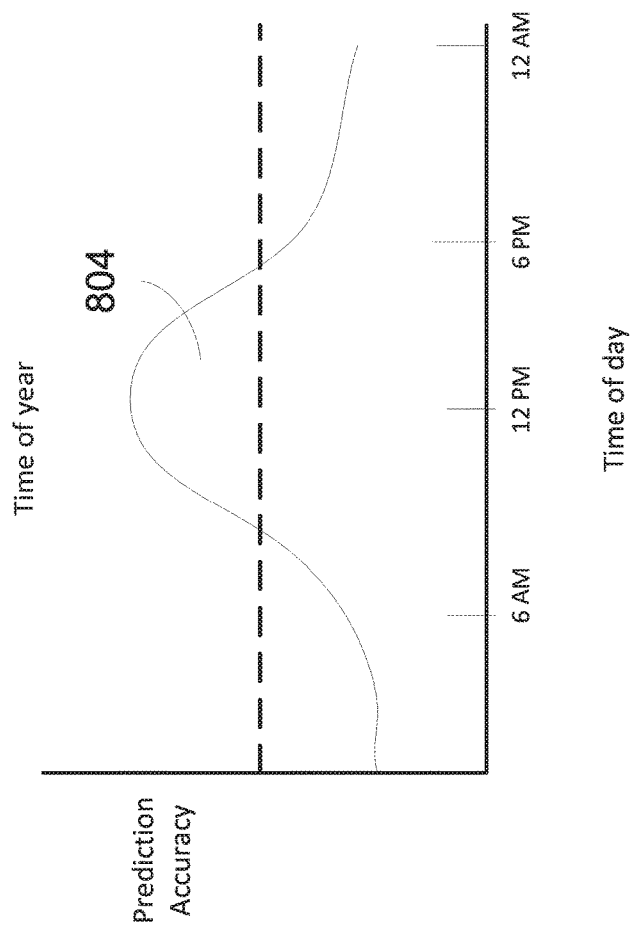
FIG. 8B is an exemplary graph of predictive accuracy of corrosion versus time of day.

FIG. 7B is similarly identical to the flow chart of FIG. 6 except that in step 728, which is analogous to step 608 in FIG. 6, which is analogous to step 608 in FIG. 6, the machine algorithm executes code which optimizes performance using the time of day of testing as a deployment condition variable. Like the time of year, the time of day partially determines the intensity of sunlight and level of humidity. For the similar reasons as for time of year, it would therefore be useful for engineers to know what times of day are optimal for corrosion testing. In step 738, after it is determined by code executing in the processor whether the test data has exceeded the threshold for performance, the optimal times of day for can be determined and reported as an output of the machine learning and testing process. FIG. 8B is an exemplary graph of performance versus time of year and shows that over a portion of the day 804 (covering the middle of the day) the performance is above a preset accuracy threshold (e.g., 85%). The graph of FIG. 8B indicating that the middle of the day in a range from a few hours before to a few hours after noon is, in general, the best time for performing corrosion testing of structures in the field. It is noted that the example graph shown in FIG. 8B is also merely illustrative of the principles of the present invention and is not meant to represent that these times of the day are necessarily optimal in this regard.

Figure 7C:
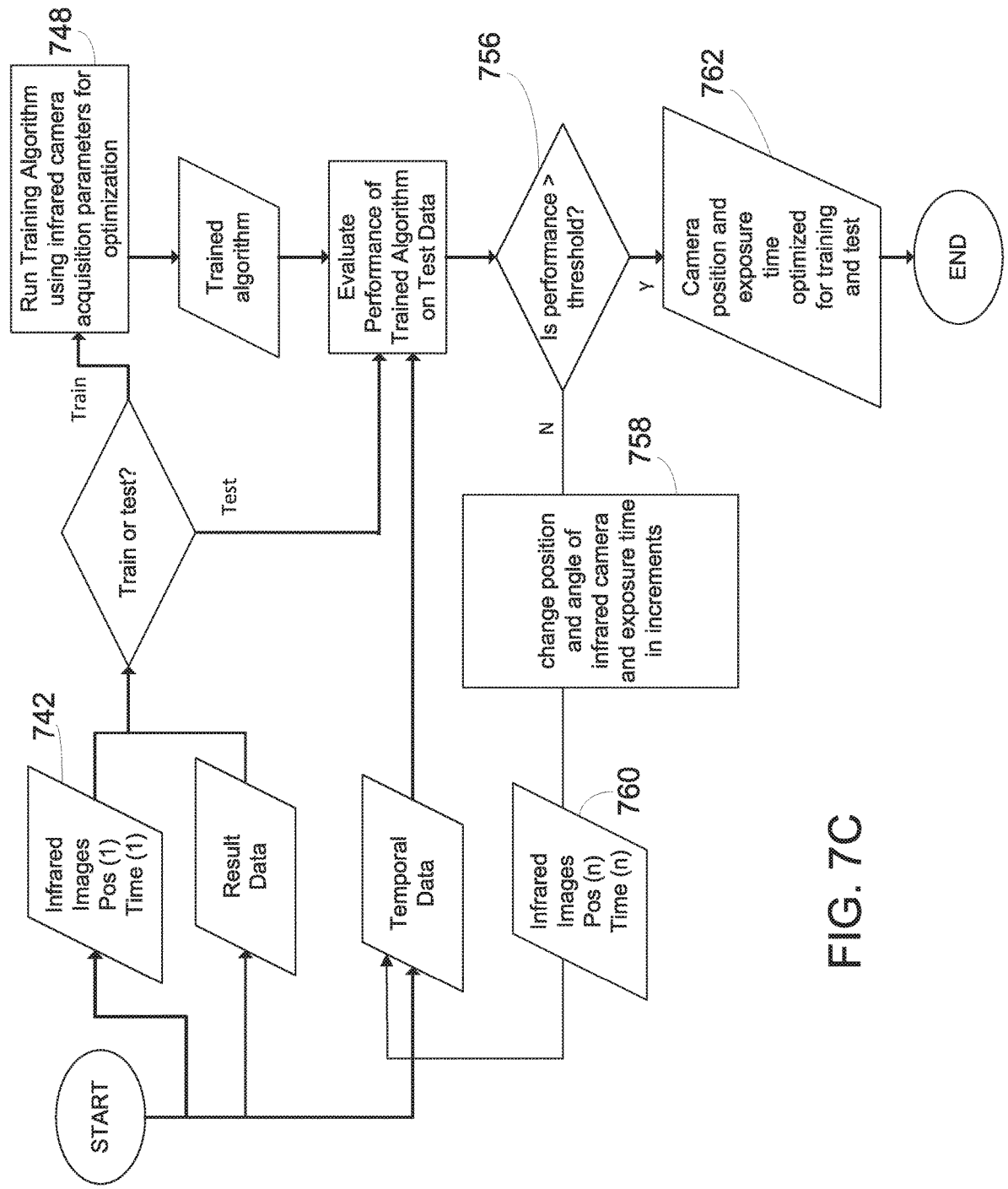
FIG. 7C is a flow chart for optimizing investigative kit position, orientation and image capture duration for corrosion detection according to an embodiment of the present invention.

FIG. 7C is a flow chart of a method for optimizing investigative coverage of an area by optimizing the position of the cameras of the investigative kits, and/or the duration of camera utilization. In the field the infrared cameras and other devices can be arranged at various distances and angles with respect to the structure(s) of interest. Moreover, the amount of time that the infrared camera or other sensors acquire data from a particular section can vary based on user settings. Some arrangements can be more conducive to obtaining high-quality thermal images than others. In some implementations, there can be a minimum period required for exposure under which the infrared images obtained are of lower quality. On the other hand, overly long camera exposure times can increase the overall duration and cost of the investigation. In the flow chart of FIG. 7C, for the purpose of training, the infrared data input in step 742 includes metadata in addition to image data. The metadata can include the positions of each infrared camera in the investigative kits at different times, the angular position (orientation) of each camera at such times measured against reference axes, as well as the image capture duration. This metadata can be associated with the captured thermal images taken at each time increment. In step 748, a machine algorithm is executed using the input training data. In some embodiments, the machine learning algorithm is configured by code executing in the processor to optimize the parameters based on predictive accuracy (i.e., the ability to detect corrosion correctly based on the input data and result data). If in step 756, it is determined during testing of the trained algorithm using temporal testing data that performance is below a threshold, commands can be given in step 758 to automatically move the position and angle of one or more of the cameras incrementally into a new position so as to adjust the coverage of the structure by the cameras. In step 760, new infrared image data is acquired. Additionally, the image capture duration can be incremented. The deployment conditions can be incremented in series (one at a time) to better distinguish their effects. In some implementations, the cameras can be moved manually by field technical personnel. The incrementing of the deployment conditions can be done iteratively in a loop until the performance exceeds a threshold in step 756.

Once the performance exceeds the threshold, in step 762 the position, angle and exposure time variables can be considered optimized for prediction of corrosion at the preset accuracy threshold. This does not necessarily mean that the arrangement determined in step 762 is the absolute optimal arrangement for acquiring structural data. To determine the absolute optimal arrangement a series of tests can be performed, and the results compared.

Figure 7D:
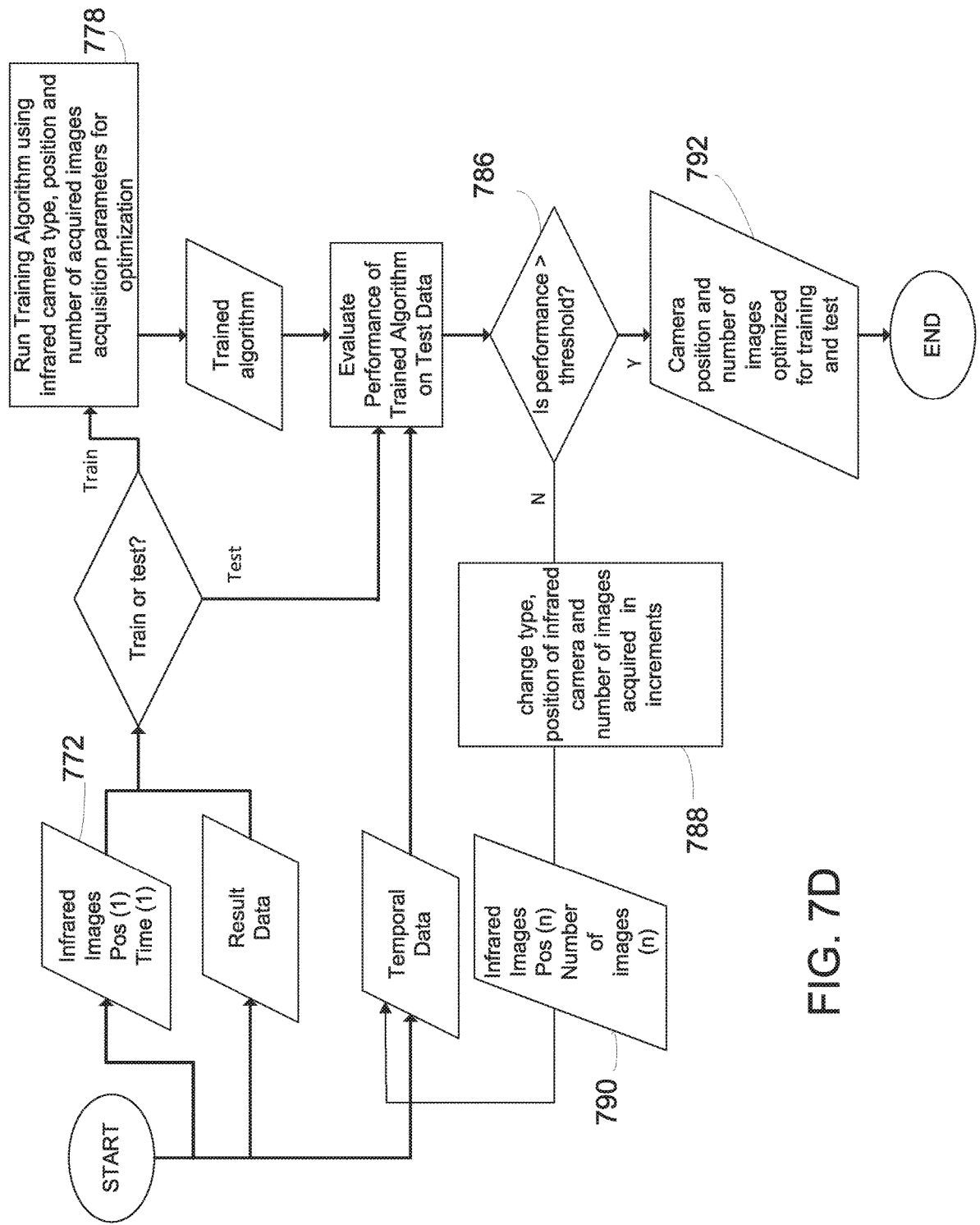
FIG. 7D is a flow chart for optimizing investigative kit position, camera type and number of images captured for corrosion detection according to an embodiment of the present invention.

FIG. 7D is a flow chart of a method for optimizing the number of infrared images acquired based on camera type, location and climate conditions. During investigation, different types of infrared cameras (e.g., cameras with aperture sizes and resolutions) can be used in the investigative kits and the positions of the cameras can be varied in different arrangements. Furthermore, depending on the investigative kit arrangements and ambient conditions, the number of images required to obtain sufficient coverage and/or clarity can change. In the flow chart of FIG. 7D, for the purpose of training, the infrared data input in step 772 includes metadata in addition to image data. The metadata can include the positions of each infrared camera in the investigative kit at different times, the type of each camera deployed, and the number of images captured by the cameras at each position. The metadata can be associated with the thermal images. In step 778, a machine algorithm is executed using the input training data. The machine algorithm optimizes performance using the infrared image metadata (i.e., position of camera n $(x_n, y_n, z_n)$ at times $t_1, t_2, t_3 \ldots$, the type of camera n $Typ_n$ and the number of images acquired by each camera n at times $t_1, t_2, t_3$. If in step 786, it is determined during testing of the trained algorithm that performance is below a threshold, commands can be given in step 788 to automatically modify the position of one ore more of the cameras and/or repeat data acquisition by one or more of the cameras of a different number of images. In step 790, new infrared image data is acquired using the incremented position and/or number of captured images. Alternatively, the cameras can be moved manually by field technical personnel. This can be done iteratively in a loop until the performance exceeds a threshold in step 776.

Once the performance exceeds the threshold, in step 792 the position, camera type and number of capture images variables can be considered optimized sufficiently for prediction of corrosion at the preset accuracy threshold. This does not necessarily mean that the arrangement determined in step 792 is the optimal arrangement for acquiring structural data. To determine the optimal arrangement a series of tests can be performed, and the results compared.

In the embodiments described above with respect to FIGS. 7A, 7B, 7C and 7D, the machine learning algorithm is design to optimize corrosion detection accuracy (i.e., the cost function of the algorithm is the discrepancy between predicted results and actual results). In other embodiments or implementations, other parameters such as the speed of the test, and the cost of the test in monetary terms can be the optimized variable so that machine learning training and tests can be performed to determine faster and/or less expensive ways of arranging or using the investigative kits of the corrosion detection system.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for predicting and detecting of corrosion under insulation (CUI) in an infrastructure asset using machine learning and data fusion comprising:
    at least one infrared camera positioned to capture thermal images of the asset;
    at least one smart mount mechanically supporting and electrically coupled to the at least one infrared camera and having a position that is adjustable with respect to the asset, the at least one smart mount including:
        a communication module;
        memory storage adapted to store thermal image data received from the at least one camera;
        a battery module operative to recharge the at least one infrared camera;
        an ambient sensor module adapted to obtain ambient condition data; and
        at least one additional sensor adapted to obtain CUI-related data from the asset;
    at least one computing device having a processor, the computing device being configured with instructions for executing a machine learning algorithm in the processor which receives input from either the communication module or memory storage of the at least one smart mount: a) thermal images of the asset; b) the ambient condition data; c) CUI-related data from the at least one additional sensor providing data fusion; and d) result data obtained from conventional CUI tests, and which outputs a CUI prediction regarding the asset; and
    a machine-learning platform adapted to train the machine learning algorithm based on accumulated input data received from the at least one computing device over time.

2. The system of claim 1, wherein the at least one computing device is adapted to test current deployment conditions of the at least one infrared camera and at least one smart mount by executing the machine learning algorithm using current infrared images, ambient sensor data and CUI-related data by determining whether performance of the machine learning algorithm under current deployment conditions meets a threshold level.

3. The system of claim 2, wherein the performance of the machine learning algorithm conditions is measured by corrosion prediction accuracy.

4. The system of claim 2, wherein the performance of the current deployment conditions is measured by a cost of deployment and testing.

5. The system of claim 2, wherein the performance of the current deployment conditions is measured by a speed of deployment and testing.

6. The system of claim 2, wherein the deployment conditions tested by the at least one computing device include a time of year in which the at least one infrared camera and at least one smart mount are deployed.

7. The system of claim 2, wherein the deployment conditions tested by the at least one computing device include a time of day in which the at least one infrared camera and at least one smart mount are deployed.

8. The system of claim 2, wherein the deployment conditions tested by the at least one computing device include a position, orientation and image capture duration of the at least one camera.

9. The system of claim 2, wherein the deployment conditions tested by the at least one computing device include a position, type and number of images captured per time period of the at least one camera.

10. A method of optimizing deployment conditions of at least one investigative kit for obtaining data from an infrastructure asset to enable prediction and detection of corrosion-under-insulation (CUI) comprising:
   receiving thermal images, sensor data acquired from asset over time acquired by the at least one investigative kit, and deployment condition information regarding the at least one investigative kit;
   obtaining result data of conventional CUI detection methods corresponding of the asset over time;
   training a machine learning algorithm using the captured thermal images and other sensor data and the result data acquired from the asset; and
   testing the deployment conditions of the at least one investigative kit by:
      receiving current test conditions including ambient condition data and current deployment conditions at the at least one investigative kit to obtain ambient condition data over time;
      executing the machine learning algorithm using the ambient conditions data and current deployment conditions of the at least one investigative kit;
      determining whether a performance of the machine learning algorithm based on the test conditions exceeds a preset performance threshold;
      if performance of the machine learning algorithm exceeds the threshold, optimizing the deployment conditions using the test conditions;
      if performance of the machine learning algorithm does not exceed the threshold, changing the deployment conditions of the at least one investigative kit; and
   iteratively repeating execution of the machine learning algorithm until performance exceeds the threshold or a set number of repetitions have been conducted.

11. The method of claim 10, further comprising measuring the performance of the machine learning algorithm based on corrosion prediction accuracy using current test conditions.

12. The method of claim 10, further comprising measuring the performance of the machine learning algorithm based on a cost of deployment and testing.

13. The method of claim 10, further comprising measuring the performance of the machine learning algorithm based on a speed of deployment and testing.

14. The method of claim 10, wherein the current deployment conditions include a time of year at which the at least one investigative kit is deployed.

15. The method of claim 10, wherein the current deployment conditions include a time of day at which the at least one investigative kit is deployed.

16. The method of claim 10, wherein the current deployment conditions include tested by the at least one computing device include a position, orientation and image capture duration of the at least one investigative kit.

17. The method of claim 10, wherein the current deployment conditions include tested by the at least one computing device include a position, type and number of images capture per time period of the at least one investigative kit.

* * * * *